Dec. 25, 1956     A. R. WIRKKALA     2,775,492
CUSHIONED MOUNTINGS FOR GUIDE ROLLERS OF CRAWLER TRACKS
Filed March 22, 1954
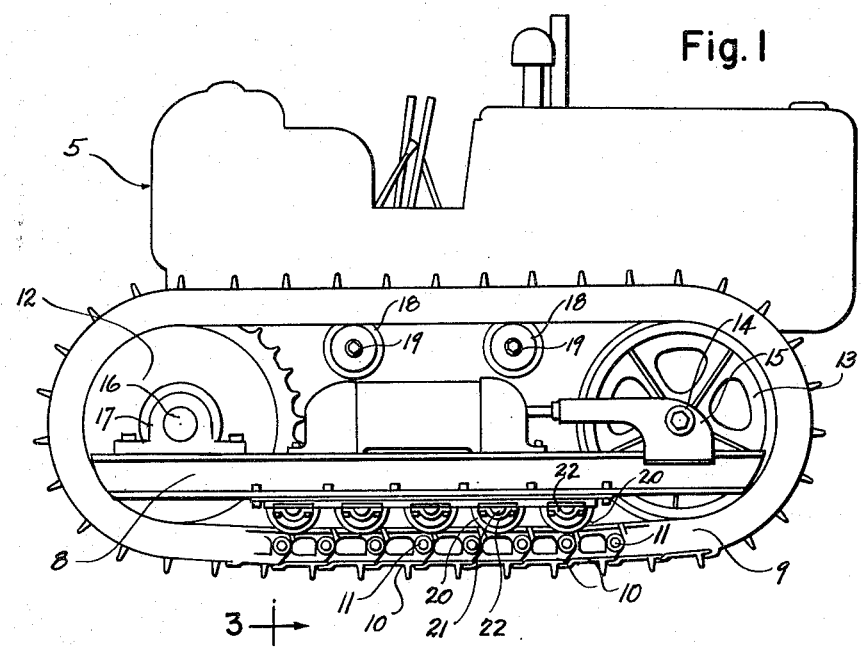
Fig. 1
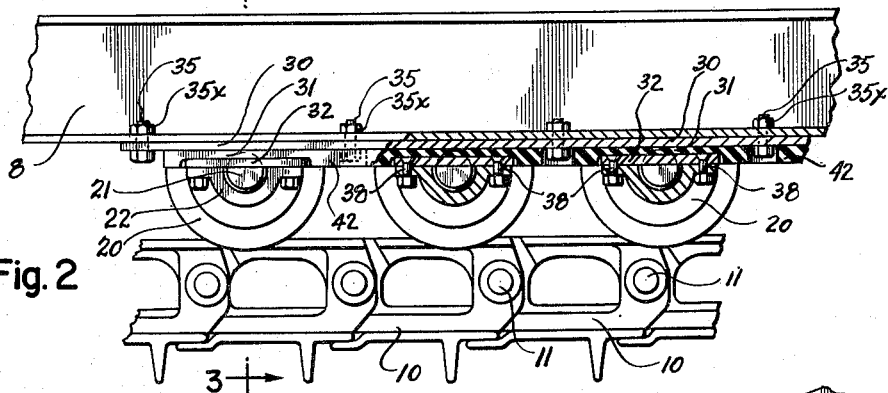
Fig. 2
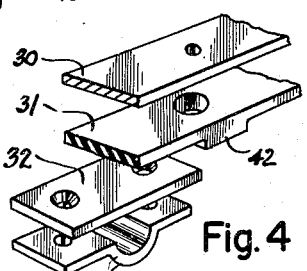
Fig. 3
Fig. 4
INVENTOR.
Albert R. Wirkkala
BY 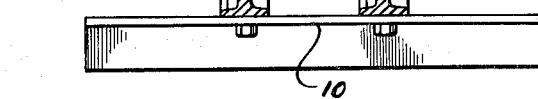
ATTORNEYS

United States Patent Office 2,775,492
Patented Dec. 25, 1956

2,775,492

CUSHIONED MOUNTINGS FOR GUIDE ROLLERS OF CRAWLER TRACKS

Albert R. Wirkkala, Naselle, Wash.

Application March 22, 1954, Serial No. 417,824

2 Claims. (Cl. 305—10)

This invention relates to tractors and more particularly to improvements in the track mounting means used in tractors that are designated as being of crawler type.

More specifically stated, the present invention has to do with novel means for cushioning the mountings of the track guide rollers that are applied to the track frames and against which the lower runs of the tractor's crawler tracks operate in their travel between the forward and rearward track belt mounting wheels.

It is the principal object of the present invention to provide cushioned mountings for the track guide rollers that will materially reduce operating shock, jar and impact thereon and will thus add materially to the life of the rollers, their bearings and other parts that are directly associated therewith.

More specifically stated, the primary object of the present invention resides in the incorporating of resilient cushioning strips of rubber, or the like, between the bearings which mount the guide roller supporting axles and the track frame structure, and in the specific manner in which the cushioning strips are associated with the metal parts between which they are located.

Still further objects and advantages of the present invention reside in the details of construction of parts for mounting and for cushioning the track guide rollers; in their assembled relationship and in their mode of use, as will hereinafter be fully described.

In accomplishing the above mentioned and other objects of the invention, I have provided the improved details of construction, the preferred forms of which are illustrated in the accompanying drawings, wherein:

Fig. 1 is a side view of a portion of a tractor showing a crawler track and its mounting frame, with track guide rollers mounted on the frame by cushioning means embodied by the present invention.

Fig. 2 is an enlarged portion of track frame and crawler track, showing the interposed track guide rollers; certain parts of the roller mountings being in section for better understanding.

Fig. 3 is an enlarged cross-sectional view taken on the line 3—3 in Fig. 2 particularly illustrating the disposition of the rubber cushioning strips between track frame members and roller bearings.

Fig. 4 is a perspective view showing one of the bearings and parts of the cushioning strip.

Referring more in detail to the drawings:

In Fig. 1, I have illustrated, in side elevation, a portion of a common form of tractor that is designated in its entirety by reference numeral 5. The tractor is equipped at each side with a track frame, as at 8, and a crawler track belt 9 mounted for travel in the usual way about the frame. The crawler track belt 9 comprises a succession of traction shoes 10, that are hingedly joined edge to edge by hinge pins 11. The continuous belt, provided by these hingedly joined shoes, operates at one end, about a supporting and driven sprocket wheel 12 and at its other end about a carrying wheel 13. The front wheel 13 is supported to turn in an axle 14 that is mounted at its opposite ends in bearings, such as that designated at 15, that are adjustably mounted on the forward end of the track frame structure. The sprocket wheel 12 is fixed on a driven axle 16 that is revolubly mounted in bearings, as at 17, that are fixed to the rear end of the track frame structure. The upper run of the track belt 9 is supported between the wheels 12 and 13 by one or more rollers 18 that are revolubly mounted in the frame structure by axles 19. The lower run of the track belt is guided and backed by a succession of rollers 20, each mounted to turn on an axle 21 which is carried at its opposite ends in bearing blocks 22—22; these blocks being fixed, as presently described in detail, to the track frame structure 8.

It is the function of the several rollers 20 to engage the lower run of the track belt 9 between wheels 12 and 13 to guide it and to sustain the jar, jolt and impact applied to this part of the track. Consequently they are subjected to considerable strain and wear incident to the normal operation of such tractors over rough and uneven surfaces, and by reason of this, the rollers and their mountings are a source of trouble necessitating frequent repair or replacements. To correct this condition has been one of the primary objects of this invention.

The track frames of different tractors vary in details of construction but, in a general way, they are alike in that each comprises a beam or beams, extended in the lengthwise direction of the tractor, which at opposite ends mounts wheels that may be like, or similar to, the wheels 12 and 13 about which the forward and rearward ends of a crawler track belt operates, and which frame is pivoted on the tractor in such manner as to permit it to oscillate to limited extent in a vertical plane. The number of track sustaining and guiding rollers 20 that engage the lower run of the track belt varies in tractors of different makes and sizes, as does also the details of construction of the track shoes, but the rollers of all makes of tractors are alike to the extent that they are mounted on supporting axles that are fixed in the track frame, and engage in rolling contact with the inner surfaces of track shoes as the track travels. The frame structure which mounts the crawler track belt 9, herein designated in its entirety by reference numeral 8, comprises parallel and spaced inside and outside channel beams 8a and 8b, such as shown in Fig. 3, on which the track guide rollers 20 are mounted through use of parts embodying the specific cushioning means of this invention, which will now be described.

Extending along the under sides of the lower, horizontal flanges of the track frame beams 8a and 8b, and fixed thereto, are elongated metal plates 30. Coextensive with each of these plates, and vulcanized to the flat under surface thereof, is a rubber cushioning strip 31 of substantial thickness. Vulcanized to the under surface of the rubber strip, at predetermined spaced intervals therealong are flat metal plates 32, each plate serving as a base for seating one of the previously mentioned bearings 22.

These cushioning units, as comprised by the parts 30, 31 and 32, are fixed on the beams 8a and 8b of the track frame in transverse alignment and they are secured to the flanges of the corresponding supporting beams by a plurality of bolts 35 which are applied upwardly through the plate 30 and the beam flanges and secured by nuts 35x applied to their upper ends.

Applied downwardly through the opposite end portions of each of the plates 32 and flanges of the bearings 22 are bolts 38 which secure the bearings 20.

By so mounting the cushioning units and bearings, the bearings can be individually removed from their plates 32 if this should be desired, and without disturbing the cushioning unit. Also, if it is desired to remove the cushioning unit, this can be done upon removal of the nuts 35x from the upper ends of the bolts 35.

It is desirable in this arrangement of bearings 22 along the rubber cushioning strip, to terminate the plates 32 substantially even with the ends of the attaching flanges of the bearings and to extend the rubber of the cushioning strip down between the ends of adjacent plates and bearings, to serve as abutments and spacers 42. These abutments serve to cushion the bearings in the longitudinal direction and add to the security of the unitary structure as comprised by the metal plates vulcanized to the rubber cushioning strip.

Track guide wheels 20, so mounted, will have longer life; their bearings will be less subjected to breakage and wear, the usual requirement for constant or frequent repair is eliminated without detriment to operation.

Modification of the manner of mounting the bearings 22 is possible without departing from the spirit of the invention. Therefore, it is not desired that the following claims be restricted in scope to the details of construction herein shown, and described but that they shall be given an interpretation that is commensurate with the invention disclosed.

Having thus described my invention, what I claim as new there and desire to secure by Letters Patent is:

1. A unitary cushioned mounting for supporting the mounting axles of a succession of rollers as employed for the backing and guiding of the round engaging run of a crawler track belt as employed on a tractor of the character described; said unitary cushioned mounting comprising a flat metal attaching plate of a length sufficient to span the succession of rollers, and adapted to be applied flatly against and bolted to the under surface of a longitudinal track frame beam beneath which the ground engaging run of the crawler track operates, a strip of cushioning rubber substantially of the length and width of said attaching plate, and applied against and vulcanized to its under surface, metal bearing plates for seating the ends of the axles of the rollers to be served, vulcanized to the under surfaces of the rubber strip, in spaced relationship therealong, and an axle securing cap bolted to the outer face of each bearing plate, to coact therewith for securement of a roller mounting axle between them; said mounting being removable as a unit from the mounting beam upon release of its securing bolts and the said caps being independently removable from their plates for release of the axle held thereby.

2. The unitary cushioned mounting of claim 1 wherein the strip of cushioning rubber is recessed at intervals along its under surface and said metal bearing plates are fitted in said recesses with their lower surfaces flush with the lower surface of said strip.

References Cited in the file of this patent

UNITED STATES PATENTS

| | | |
|---|---|---|
| 1,106,595 | Tolles | Aug. 11, 1914 |
| 1,399,370 | White | Dec. 6, 1921 |
| 1,520,416 | Holt | Dec. 23, 1924 |
| 2,393,369 | Hait | Jan. 22, 1946 |
| 2,474,057 | Le Tourneau | June 21, 1949 |